(12) United States Patent
Fischer

(10) Patent No.: US 7,472,491 B2
(45) Date of Patent: Jan. 6, 2009

(54) MEASURING PROBE, ESPECIALLY FOR A DEVICE FOR THE MEASUREMENT OF THE THICKNESS OF THIN LAYERS

(75) Inventor: Helmut Fischer, Oberägeri (CH)

(73) Assignee: Immobiliengesellschaft Helmut Fischer GmbH Co. KG, Sindelfingen (DE)

( * ) Notice: Subject to any disclaimer, the term of this patent is extended or adjusted under 35 U.S.C. 154(b) by 0 days.

(21) Appl. No.: 11/599,627

(22) Filed: Nov. 14, 2006

(65) Prior Publication Data

US 2007/0186434 A1     Aug. 16, 2007

(30) Foreign Application Priority Data

Nov. 14, 2005    (DE) .................. 10 2005 054 593

(51) Int. Cl.
*G01B 7/28* (2006.01)
(52) U.S. Cl. .......................... 33/561; 33/558
(58) Field of Classification Search .................. 33/559, 33/834, 556, 558, 561
See application file for complete search history.

(56) References Cited

U.S. PATENT DOCUMENTS

| | | | | |
|---|---|---|---|---|
| 4,175,331 A | * | 11/1979 | Johnson | 33/556 |
| 4,473,955 A | * | 10/1984 | McMurtry | 33/561 |
| 4,734,994 A | * | 4/1988 | Cusack | 33/561 |
| 4,763,417 A | * | 8/1988 | Ernst | 33/561 |
| 4,910,879 A | * | 3/1990 | Golinelli et al. | 33/832 |
| 4,934,065 A | * | 6/1990 | Hajdukiewicz et al. | 33/832 |
| 5,111,592 A | * | 5/1992 | Aehnelt et al. | 33/561 |
| 5,222,304 A | * | 6/1993 | Butler | 33/561 |
| 5,326,982 A | * | 7/1994 | Wiklund | 250/559.19 |
| 5,509,211 A | * | 4/1996 | Ernst | 33/561 |
| 5,806,201 A | * | 9/1998 | Feichtinger | 33/561 |
| 6,449,861 B1 | * | 9/2002 | Danielli et al. | 33/556 |
| 6,977,498 B2 | | 12/2005 | Scherzinger et al. | |
| 2005/0055839 A1 | * | 3/2005 | Brenner et al. | 33/559 |

FOREIGN PATENT DOCUMENTS

DE    10348652 A1    5/2004

* cited by examiner

*Primary Examiner*—Christopher W Fulton
(74) *Attorney, Agent, or Firm*—Kriegsman & Kriegsman

(57) ABSTRACT

The invention relates to a Measuring probe for a device for the measurement of the thickness of thin layers, with a housing (14) comprising at least one sensor element (17), which is accepted along a longitudinal axis (16) of the housing (14) at least slightly movable to the housing (14) and with a contact spherical cap (21) assigned to the at least one sensor element (17) for setting the measuring probe (11) onto a surface of a measuring object, wereby in that the at least one sensor element (17) is accepted by a holding element (18)—along the longitudinal axis (16) of the housing (14)—which is designed spring-loaded resiliently and which is fastened on the housing (14).

20 Claims, 2 Drawing Sheets

Figure 1:
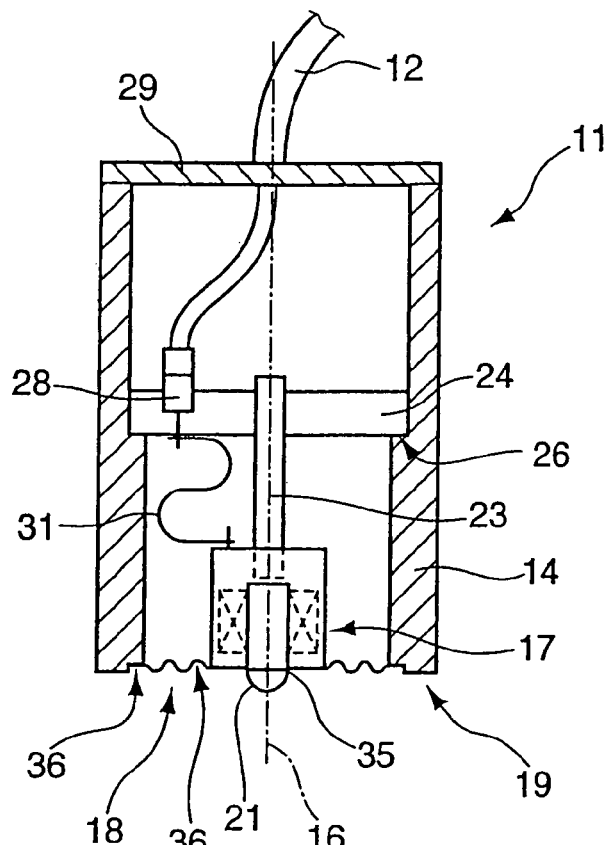

MEASURING PROBE, ESPECIALLY FOR A DEVICE FOR THE MEASUREMENT OF THE THICKNESS OF THIN LAYERS

The invention relates to a measuring probe, especially for a device for the measurement of the thickness of thin layers according to the generic part of claim 1.

From DE 103 48 652 A1, a measuring probe is known which comprises a housing for the reception of at least one sensor element. For setting the measuring probe onto a surface of the measuring object, a contact spherical cap is provided which is in connection with the sensor element. The sensor element is, for example, in connection with a printed circuit board which comprises a flexible strip as connecting lines which lead to a housing connection. The housing receiving the sensor element is movably guided in a sleeve. When setting the measuring probe onto a measuring object, the housing can immerse into the sleeve so that—via the sleeve—the measuring probe will be positioned on the measuring object, and the contact spherical cap resting on the surface of the measuring object will be ensured. For the movable reception of the housing in the sleeve, a guide is provided between the housing and the sleeve, as well as a pressure spring to position the housing in a lower position to the sleeve in which the contact spherical cap will project versus one sleeve end.

These devices have proven successful in use. However, the requirements on the measuring precision of such measuring probes are steadily increasing.

Accordingly, the invention is based on the objective of further developing a measuring device of the aforementioned type, in which a reduced friction arrangement of the measuring probe element enables an increased precision of measurements with the measuring probe.

According to the invention, this objective is solved by the features of claim 1. Other advantageous embodiments are indicated in the other dependent claims.

The development of a measuring probe according to the invention with a spring-loaded resilient holding element along the longitudinal axis of the housing—said holding element accepting the at least one sensor element—will enable a considerably friction-reduced or, respectively, virtually frictionless arrangement of the sensor element to the housing. This can enable a sensitive measurement—without any deflection of the holding element influenced by friction when the measuring probe is set onto a surface of the measuring object. Moreover, the number of moving parts will be considerably reduced. Furthermore, a reduction of moving masses can result which in turn will increase the precision of measurement.

According to an advantageous development of the invention, it is provided that the spring-loaded resilient holding element is provided on one end of the housing facing towards the measuring object. This will enable a simple fastening of the holding element to the housing. Moreover, a simple installation is provided since the holding element—with the at least one sensor element arranged thereon—is simply inserted into the housing to subsequently connect the holding element with the end of the housing facing towards the measuring object.

According to a preferred embodiment of the invention, the holding element is designed as a disk shaped diaphragm. Such disk shaped diaphragms have a low weight. Their thickness can be designed within the range of tenths of a millimeter. Such diaphragms enable a defined deflection to the center axis and furthermore provide the advantage that—in radial direction—a secure and exact reception of the at least one sensor element to the housing is given or, respectively, no deflection of the center axis will be possible. The probe is thus radially positioned without clearance. As a result of the low mass, this arrangement will reduce any damage to sensitive surfaces and any wear of the spherical measuring pole. The statistical contact factor of the measuring probe will be considerably reduced thereby since any tilting of the measuring probe will be prevented by the radial guidance without clearance. Thus, layer thicknesses in the nanometer range can still be measured. Accordingly, unambiguous guiding or, respectively, displacement of the at least one sensor element can be made possible along the longitudinal axis of the housing, and the prevention of tilting or radial deflection.

For the adjustment of the resilience of the holding element formed as a disk shaped diaphragm, at least one wave shaped depression and/or elevation is provided. The force of deflection can be determined thereby. Another parameter for the adjustment of the force of deflection is the wall thickness of the diaphragm, as well as the material used for it. Moreover, even the lift for deflection of the disk shaped holding elements can be defined by the size of the disk shaped diaphragm.

According to an alternative embodiment of the holding element, it is provided that a spring disk with circular segment punchings will be used as a resilient holding element. Such a spring disk also enables resilience along the longitudinal axis of the housing and inflexibility in radial direction. Thus, a clear displacing movement is achieved while the contact spherical cap—, and thus the sensor element—is set onto the surface of the measuring object.

In its center axis, the holding element preferably comprises a hole into which a contact spherical cap or a sensor element can be inserted. A precise manufacture of the measuring probe can be achieved thereby since the hole of the measuring probe is exactly provided during the manufacture of the diaphragm, and thus a direct alignment of the sensor element to the hole will be enabled. At the same time, simple and fast installation of the at least one sensor element to the holding element will be enabled.

Preferably, the at least one sensor element is fastened directly on the holding element aligned towards the center axis. A reduction of weight can in turn be achieved thereby, and a cost reduction in manufacture.

According to a preferred embodiment of the invention, the holding element is held wedged between a contact spherical cap and a sensor element or, respectively, a coupling element of the sensor element. This can provide for a simple as well as precise positioning. On the contact spherical cap and/or the coupling element, a shoulder is preferably provided against which a punching of the holding element is resting. At the same time, simple production is provided thereby which enables no special alignment of the components and yet a precise reception. According to another advantageous embodiment of the invention, it is provided that the at least one sensor element comprises a guiding element which extends into the housing and is movably guided in a housing-fixed bearing. Due to this arrangement, an exclusive deflection movement of the sensor element in the direction of contact of the measuring probe can be achieved without any tilting of the at least one sensor element to the housing.

Between the sensor element and a housing-fixed bearing or a wall section of the housing, a spring element is preferably provided which keeps the holding element under at least low pre-stress. A defined position of the sensor element can thereby be holdingly adjusted. At the same time, improved power ratios can thereby be provided in the deflection or, respectively, the immersion of the sensor element into the housing. Due to this pre-stress, the holding element is positioned—with at least a slightly outward camber—to the housing of the measuring probe.

The holding element preferably comprises a spring excursion which enables at least that an end section of the housing is applied flush to the contact spherical cap of the sensor element set on the measuring object. Thus, a complete immersion of the contact spherical cap can be ensured versus the end section of the housing when setting the measuring probe on a surface of the measuring object, without the holding element being burdened by excessive strain.

It is preferably provided that the immersion movement of the sensor element is limited by a preferably adjustable limit stop. This limit can be provided, for example, in coordination with the spring excursion of the holding element. Moreover, such an adjustable limit stop can be a protective function for the deflection of the holding element.

Between the limit stop and the sensor element, a spring, a spring element or a reset device is preferably provided on a guiding element which will rest on the bearing or a wall section of the housing. This will ensure that—after the measuring probe is lifted up from the surface of the measuring object—the automatic reset of the sensor element into a starting position will be supported and especially ensured.

For the radial alignment of the holding element according to the invention it is provided according to a preferred embodiment of the invention that the holding element is provided in a housing end side depression. This enables an exact arrangement of the holding element in radial direction to the housing and thus an alignment of the deflection movement in the longitudinal axis of the housing.

It is preferably provided that the holding element is fastened on the housing by an adhesive, screwing, welding, soldering, clamping, or snap connection. The individual types of fastening can be selected depending on the materials of the holding elements as well as those of the housing.

The holding element designed as a disk shaped diaphragm is preferably fastened—tight to the mediums—to the housing. This will achieve an increase in the service life as well as an increased precision in measurement. Any contamination by fine dirt particles or dust will not impair the deflection movement of the at least one sensor element since the deflection movement is provided via the holding element designed as a disk shaped diaphragm and the measuring probe will thus be completely closed towards the outside.

With the holding element designed as a spring disk with circular punchings, it is preferably provided that a film-like layer will close the punchings. The flexibility of such a spring disk can thereby be maintained while, at the same time, a measuring probe is formed which is entirely closed towards the outside. The film-like layer can be provided as a plastic film or as a metal foil or nonferrous metal foil.

In particular when the measuring probe is used for measurements according to the eddy current principle, the holding element will be made of a plastic film or of a composite plastic film, especially Mylar, polyimide, polycarbonate, polyester or kaptone. The holding element can be machined especially by laser machining to achieve high precision.

When the measuring probe is used for performing the measuring process according to the magnetic induction principle, a diaphragm of a metallic non-magnetic material can be used, especially a copper/beryllium alloy.

Figure 2:
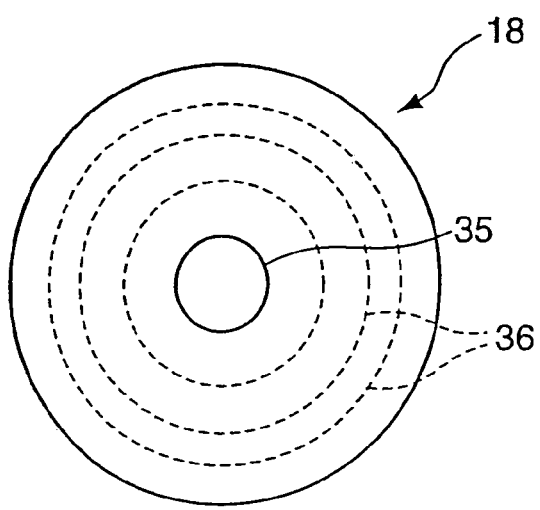
Figure 3:
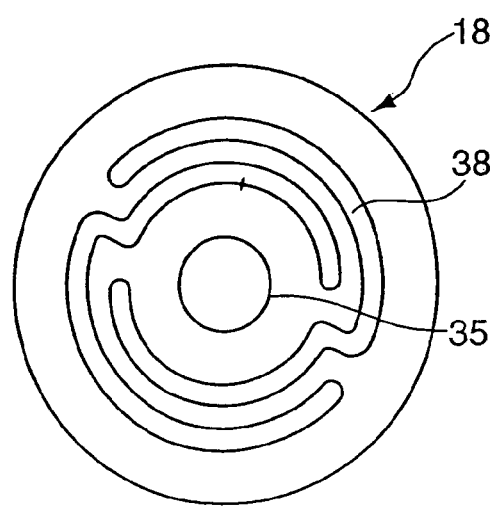
Figure 4:
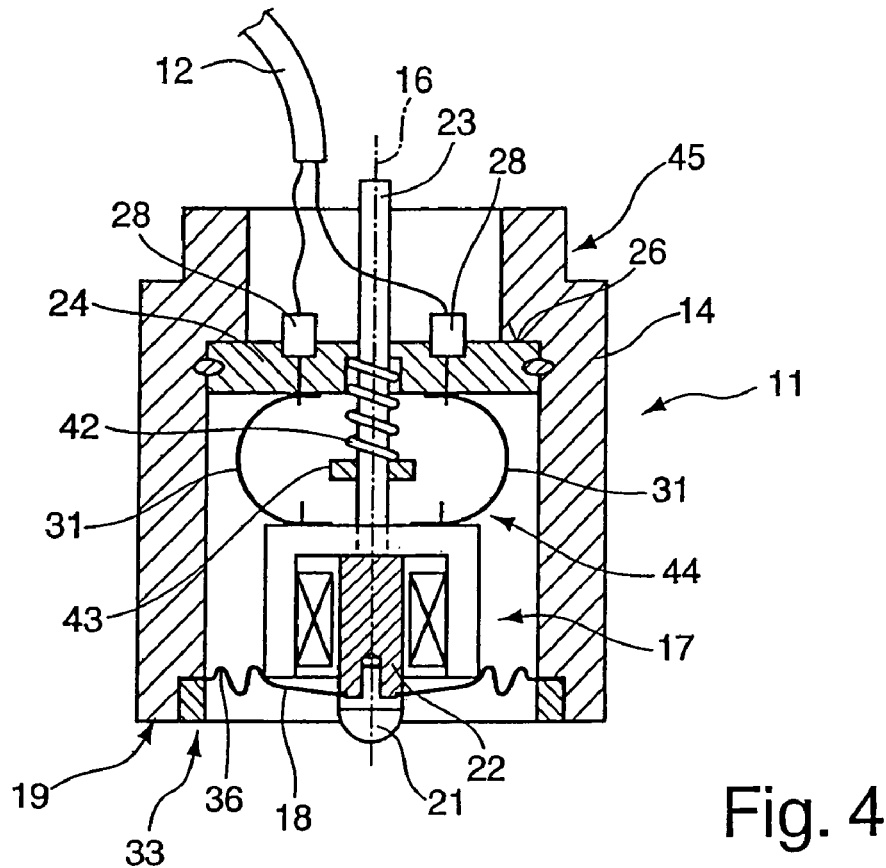
Figure 5:
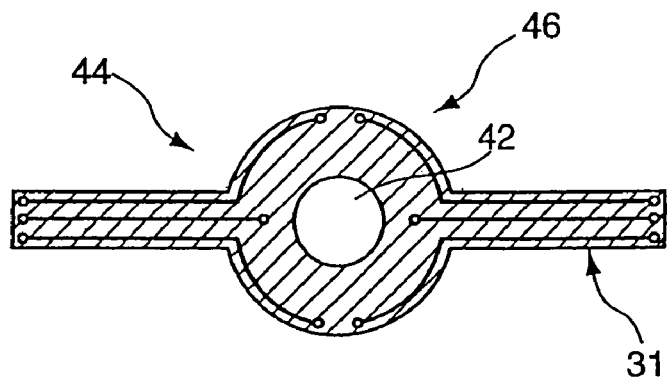

In the following, the invention as well as additional advantageous embodiments and refinements of the same will be explained and described in detail on the basis of the examples presented in the drawings. The features which can be gathered from the description and the drawings can be used individually by themselves or in a plurality in any combination according to the invention. In the Figures:

FIG. 1 shows a diagrammatic cross section of a measuring probe according to the invention;

FIG. 2 a diagrammatic top view of a first embodiment of a holding element according to the invention;

FIG. 3 a diagrammatic top view of another embodiment of the holding device according to the invention;

FIG. 4 a diagrammatic sectional view of an alternative embodiment of the invention;

FIG. 5 a diagrammatic view of a flexible printed circuit board; and

Figure 6:
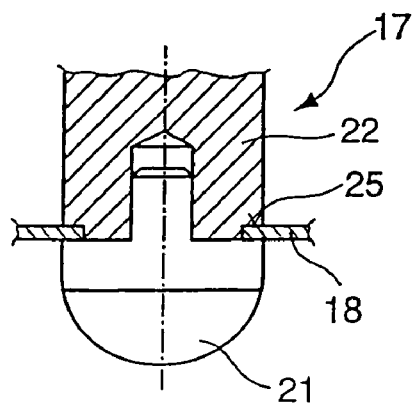

FIG. 6 an enlarged diagrammatic view of a contact spherical cap.

FIG. 1 shows a measuring probe 11 for a device not shown in detail for the measurement of the thickness of thin layers. This measuring probe 11 is used for the non-destructive measurement of layer thicknesses. According to the exemplary embodiment, this measuring probe 11 can be provided separately to the device for the measurement of the thickness of thin layers and will transmit the registered measuring values via a connecting line 12. Alternatively, this measuring probe 11 can be part of the device for the measurement of the thickness of thin layers in the form of a stationary device or a manual device.

The measuring probe 11 comprises a housing 14 which is especially cylindrical in design. In a longitudinal axis 16 of the housing 14, at least one sensor element 17 is preferably arranged. This sensor element 17 is carried by a holding element 18 which is received on an end section 19 of the housing 14. On the at least one sensor element 17, a contact spherical cap 21 is provided in the longitudinal axis 16 of the housing 14 which—upon setting the measuring probe 11 on—will rest on a surface of a measuring object not shown in detail.

The at least one sensor element 17 is, for example, formed by a primary and secondary coil with a magnet, with at least one coil on a solenoid, or as a non-shielded dipole. Such a sensor element 17 enables a measurement according to the magnetic induction method. The magnetic induction method is suitable for measuring the thickness of nonferrous metal layers such as, for example, chromium, copper, zinc or the like on magnetizable basic materials, such as steel and iron for example, as well as for color, paint, and plastic layers on magnetizable basic materials such as steel and iron, for example. The measuring range is, for example, at a layer thickness of up to 1,800 μm; preferably, a frequency of less than 300 hertz will be used. Alternatively, it can be provided that the at least one sensor element 17 comprises a coil which is provided on a field concentrator near a Hall sensor. This Hall sensor is provided directly behind the contact spherical cap 21. With such a sensor element, execution according to the eddy current method will be enabled, i.e. the measurement of the thickness of electrically non-conductive layers on non-ferrous metals will be enabled, e.g. of colors, paints, plastics on aluminum, copper, brass, stainless steel or other anodized layers on aluminum in a high-frequency alternating field.

The at least one sensor element 17 comprises a guiding element 23 arranged coaxially to the longitudinal axis 16, said guiding element being movably received in a housing-fixed bearing 24. The precision for a tilt-free setting movement of the measuring probe 11 on the surface of the measuring object will be increased thereby. The bearing 24 can be designed as an air-cushion bearing or a low-friction slide bearing. This housing-fixed bearing 24 is preferably arranged on a shoulder 26 of the housing 14, which in turn enables a fast and simple positioning of the bearing 24 in radial and axial direction. The bearing 24 furthermore comprises a connection 28 which is provided for the connection of the connecting line 12.

Depending on the purpose of application, the housing 14 can be correspondingly completed. For example, for the design of an independent probe according to the exemplary embodiment, the housing 14 is closed, after connection of the connecting line 12, by means of a cover 29 or a closure so that a hand-held measuring probe will be connected via a connecting line 12 with a stationary device. Upon insertion into a manual measuring probe or into a stationary device, the cover 29 can be omitted.

Between the sensor element 17 and, for example, the connection 28 on bearing 24, a flexible line 31 or a flexible line strip is provided which will withstand bending stress. Such bending stress will be effected by the lifting movement of the at least one sensor element 17 when setting the probe on the surface of a measuring object. In this case, the sensor element 17 immerses at least slightly into the housing 14.

The disk shape designed holding element 18 is preferably fastened on a housing end side depression 33 on the end section 19. In a simple manner, this in turn ensures a radial and axial alignment. In a first embodiment, the holding element 18 is fastened—tight to the mediums—in the depression 33. At the same time, the contact spherical cap 21 and/or the sensor element 17 are provided, tight to the mediums, in a hole 35 of the holding element 18. The housing 14 is thus hermetically sealed towards the outside so that there will be no impairment of the setting movement and accordingly the immersion of the at least one sensor element 17 in the housing 14 due to contaminations.

FIG. 2 shows a diagrammatic top view of the holding element 18 according to FIG. 1. This thin, disk shaped diaphragm comprises a central hole 35 through which a contact spherical cap 21 can be passed. In the directly adjacent marginal area, the at least one sensor element 17 can abut to the holding element 18 or rest on it, respectively. Accordingly, a planar contact surface is preferably provided. Next to that, elevations and/or depressions 36 are provided which determine the bending of the holding element 18 and the force required for it. At the same time, the sensitivity of the deflection movement can be determined thereby.

FIG. 3 shows an alternative embodiment of the holding element 18 to FIG. 2. This disk shaped holding element 18 comprises circular segment shaped punchings 38 which intermesh, for example, according to the illustration in FIG. 3. This will ensure—analogously to the embodiment according to FIG. 2—a radial alignment to housing 14 during an axial movement along the longitudinal axis 16. Such holding elements 18 can be manufactured simply and inexpensively by punching or by laser machining.

By means of the embodiment of the measuring probe 11 according to the invention, with a spring-loaded resilient holding element 18 for the at least one sensor element 17, a very light measuring probe 11 is designed which enables a twist-proof reception of the at least one sensor element 17, as well as a tilt-free arrangement for precise and frictionless guidance.

FIG. 4 shows another alternative embodiment of a measuring probe 11. Reference is made to FIG. 1 in view of the matching or, respectively, invariable features, as well as their alternative embodiments. The following describes alternatives which can also be transferred individually to the embodiment according to FIG. 1. The bearing 24 is inserted into the end section 19 of the housing 14 from the direction of the end side 19, and it rests on a shoulder 26. The bearing 24 accepts a guiding element 23, with a spring element 42 being provided between the sensor element 17 and the bearing 24, by means of which the sensor element 17 is reset to a starting position after lifting off from a surface of a measuring object.

The spring element 42 can alternatively also be provided outside of the guiding element 23 and contact on a wall section of the housing 14 or the bearing 23. In the exemplary embodiment, the spring element 42 keeps the holding element 18 under low pre-stress so that it will be held cambered to the outside in a basic position. Thus, a defined basic position of the sensor element 17 to the housing 14 will be enabled. On the guiding element 23, a limit stop 43 is preferably provided which is adjustable to the free excursion path for the deflection of the holding element 18. The limit stop 43 can rest on the bearing 24 for an excursion limit. Alternatively, the limit stop 43 can be provided on the sensor element and come to rest on an inside wall section of the housing 14.

On an end opposite the sensor element 17, the housing 14 comprises a fastening section 45 which is designed for example as a screw thread. The measuring probe 11 can thus be connected to different connections for various devices.

The outer wall section of the holding element 18 which is arranged in a depression 36 of the housing 14 is further recessed versus the embodiment in FIG. 1. Thus, a deflection movement of the holding element 18 to a minor extent can be sufficient so that the contact spherical cap 21 will come to rest flush on the end section 19 and jointly on a surface of a measuring object.

On sensor element 17, a preferably flexible printed circuit board 44 is provided which is shown in FIG. 5 in more detail. This printed circuit board 44 is connected with the connection 28. The printed circuit board 44 is provided with a central area 46 comprising a punching 47 for the guiding element 23 and being designed in the outer circumference the same or smaller than the sensor element 17. Radially extending each towards the outside, a line 31 or respectively, a flexible line strip will be provided which provides the link to the connection 28. They are so flexible that the immersion movement of the sensor element 17 can be followed. Such a printed circuit board 44 can usually be 2-pole to 6-pole in design. At the same time, the connections of the printed circuit board 44 can be plugged in a simple manner to sensor element 17 and the connection 28.

By way of example, FIG. 6 shows a fastening of the holding element 18 to the measuring pole which is designed as a coupling element 22 of the sensor element 17. The contact spherical cap 21 is connected with the coupling element 22 by means of a screwing, clamping, gluing or snap connection. The measuring pole or, respectively, the coupling element 22 is designed as a dipole. In the coupling element 22 and/or the contact spherical cap 21, a shoulder 25 is provided so that—upon positioning of the contact spherical cap 21 to the coupling element 22—the holding element 18 is fixed by clamping. The shoulder 25 is used at the same time for the radial alignment of the sensor element 17 to the holding element 18, with a radial alignment of the holding element 18 to the housing 14 also being provided by the depression 36 on the housing 14. The contact spherical cap 21 or the spherical pole can consist, for example, of sapphire, ceramic or a similarly wear-resistant, electrically non-conductive material, especially when the sensor element 17 works according to the eddy current method. In the low-frequency operating case, the contact spherical cap can also be made of steel or a similarly magnetizable material whose surface can be provided with a thin wear-resistant layer.

All of the aforementioned features are, each separately, essential for the invention and can be randomly combined with each other.

What is claimed is:

1. Measuring probe for a device for the measurement of the thickness of thin layers, with a housing comprising at least one sensor element, which is at least slightly movable along a longitudinal axis of the housing and with a contact spherical cap which is assigned to the at least one sensor element for setting the measuring probe onto a surface of a measuring object, characterized in that the at least one sensor element is carried by a holding element which is designed spring-loaded resiliently along the longitudinal axis of the housing and which is fastened on the housing.

2. Measuring probe according to claim 1, characterized in that the spring-loaded resilient holding element is arranged on an end section of the housing facing towards the measuring object.

3. Measuring probe according to claim 1, characterized in that the holding element is designed as a disk shaped diaphragm.

4. Measuring probe according to claim 3, characterized in that the disk shaped diaphragm comprises, concentrically to the center axis of the holding element, at least one wave shaped depression or elevation or depression and elevation.

5. Measuring probe according to claim 1, characterized in that the holding element is designed as a spring disk with circular segment shaped punchings.

6. Measuring probe according to claim 1, characterized in that the holding element comprises, in a center axis, a hole into which a contact spherical cap or the at least one sensor element can be inserted.

7. Measuring probe according to claim 1, characterized in that the at least one sensor element is accepted fixed to the center axis directly on the holding element.

8. Measuring probe according to claim 1, characterized in that the holding element is held wedged between a contact spherical cap and a measuring pole serving as a coupling element and is resting on a shoulder provided on the contact spherical cap or the coupling element.

9. Measuring probe according to claim 1, characterized in that the at least one sensor element comprises an especially bar-shaped guiding element which extends into the housing and is movably guided in a housing-fixed bearing.

10. Measuring probe according to claim 1, characterized in that—between the sensor element and a housing-fixed bearing or a wall section of the housing—at least one spring element is provided which preferably keeps the holding element under at least low pre-stress and in particular arranges the holding element cambered to the outside.

11. Measuring probe according to claim 1, characterized in that the holding element comprises a spring excursion so that at least one end section of the housing can be arranged flush to the contact spherical cap of the sensor element set onto a measuring object.

12. Measuring probe according to claim 1, characterized in that an immersion movement of the sensor element is limited by an adjustable limit stop.

13. Measuring probe according to claim 12, characterized in that the limit stop is provided on a guide element on which at least one spring element is provided which rests on the bearing or a wall section of the housing.

14. Measuring probe according to claim 1, characterized in that the sensor element is connected to a flexible printed circuit board which comprises at least an especially flexible line or at least a line strip which is connected with a connection.

15. Measuring probe according to claim 1, characterized in that the holding element is fixed in a housing end side depression.

16. Measuring probe according to claim 1, characterized in that the holding element is received on the housing by means of a gluing, screwing, welding, soldering, clamping or snap connection.

17. Measuring probe according to claim 1, characterized in that the holding element designed as a disk shaped diaphragm is arranged tight to the mediums to the housing.

18. Measuring probe according to claim 1, characterized in that the holding element designed as a spring disk with circular segment shaped punchings comprises a film-like layer which closes the punchings and which is fastened to the housing tight to the mediums.

19. Measuring probe according to claim 1, characterized in that the holding element is made—for the measurement according to the eddy current method—of a non-metallic material.

20. Measuring probe according to claim 1, characterized in that the holding element is Made—for the magnetic inductive measurement—of a metallic, non-magnetic material.

* * * * *